(12) United States Patent
Tanikawa

(10) Patent No.: US 9,191,863 B2
(45) Date of Patent: Nov. 17, 2015

(54) BANDWIDTH GUARANTEED SYSTEM, RADIO NODE DEVICE AND BANDWIDTH GUARANTEEING METHOD

(75) Inventor: Chikara Tanikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 644 days.

(21) Appl. No.: 13/520,738

(22) PCT Filed: Dec. 24, 2010

(86) PCT No.: PCT/JP2010/073865
§ 371 (c)(1),
(2), (4) Date: Jul. 5, 2012

(87) PCT Pub. No.: WO2011/083747
PCT Pub. Date: Jul. 14, 2011

(65) Prior Publication Data
US 2012/0275295 A1    Nov. 1, 2012

(30) Foreign Application Priority Data
Jan. 5, 2010 (JP) .................................. 2010-000352

(51) Int. Cl.
*H04W 28/18* (2009.01)
*H04L 12/911* (2013.01)
(Continued)

(52) U.S. Cl.
CPC ............. *H04W 28/18* (2013.01); *H04L 47/728* (2013.01); *H04L 47/762* (2013.01); *H04L 45/50* (2013.01)

(58) Field of Classification Search
CPC ..... H04W 40/00; H04W 40/12; H04W 24/00; H04W 28/18; H04W 45/22; H04W 45/28
USPC ....................................................... 370/217
See application file for complete search history.

(56) References Cited

U.S. PATENT DOCUMENTS 6,539,031 B1 * 3/2003 Ngoc et al. ..................... 370/470
2004/0196827 A1 * 10/2004 Xu et al. ........................ 370/352
(Continued)

FOREIGN PATENT DOCUMENTS

CN         101026536 A    8/2007
EP           1755238 A1    2/2007
(Continued)

OTHER PUBLICATIONS

International Search Report for PCT/JP2010/073865.
(Continued)

*Primary Examiner* — Huy D Vu
*Assistant Examiner* — Stephen J Clawson

(57) ABSTRACT

To establish an alternative path without giving an influence on signal continuity to a data transmission line to which a communication bandwidth cannot be secured any more when the transmission capacity decreased by adaptive modulation.
It includes a first radio node means which sets an adaptive modulation changeover margin having a predetermined width to communication quality for a trigger of performing adaptive modulation which decreases a communication bandwidth when the communication quality of a radio transmission channel section has deteriorated, and prior to performing the adaptive modulation, in the adaptive modulation changeover margin, instructs an initiator node which has established an LSP in the radio transmission channel section to reserve a bandwidth of an alternative LSP for the LSP which requires restoration of diverting to an alternative path and to change over to the alternative LSP; and a second radio node means which is the initiator node, and according to the instructions from the first radio node means, reserves a bandwidth of the alternative LSP, performs changeover to the alternative LSP and disconnects the LSP which has been changed over to the alternative LSP.

6 Claims, 14 Drawing Sheets

(51) Int. Cl.
*H04L 12/923* (2013.01)
*H04L 12/723* (2013.01)

(56) References Cited

U.S. PATENT DOCUMENTS

2005/0259570 A1 11/2005 Hayashi et al.
2007/0195715 A1 8/2007 Yamano et al.

FOREIGN PATENT DOCUMENTS

| JP | 2005333383 A | 12/2005 |
| JP | 2006287549 A | 10/2006 |
| JP | 2007221564 A | 8/2007 |
| JP | 2007288471 A | 11/2007 |
| WO | 2006001308 A1 | 1/2006 |

OTHER PUBLICATIONS

English translation of Written Opinion by ISA for PCT/2010/073865.

* cited by examiner

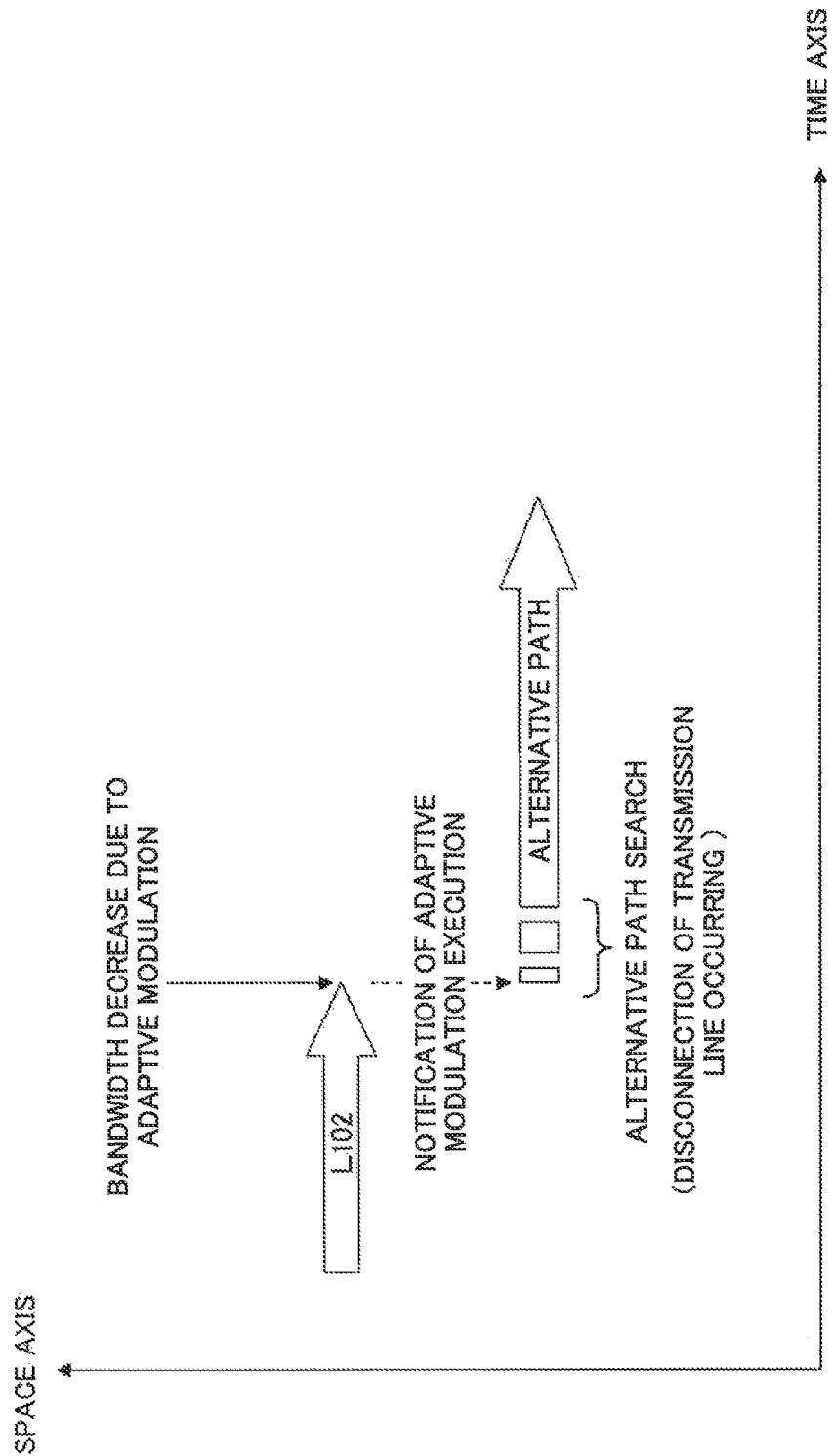

BANDWIDTH GUARANTEED SYSTEM, RADIO NODE DEVICE AND BANDWIDTH GUARANTEEING METHOD

TECHNICAL FIELD

The present invention relates to a bandwidth guaranteed system, a radio node device and a bandwidth guaranteeing method, particularly to a bandwidth guaranteed system, a radio node device and a bandwidth guaranteeing method in an MPLS (MULTI PROTOCOL LABEL SWITCHING) network which is composed of the radio node devices adopting adaptive modulation.

BACKGROUND ART

A radio system using microwaves (in particular, quasi-millimeter wave band), which tends to be influenced by rainfall attenuation, adopts adaptive type coding/modulation (henceforth, referred to as adaptive modulation) for the purpose of improvement of availability of radio links. Adaptive modulation is a technique which enables wide band and stable radio communication using radio waves as the communication medium influenced by external causes. And, adaptive modulation is technology which varies a modulation method according to a change in the propagation environment of radio waves, for example, fluctuation of bit error rate. Adaptive modulation can suppress increase of the error rate by performing low bit rate modulation at time of deteriorated condition of the propagation environment and avoid deterioration of the communication quality from being occurred. Adaptive modulation can make the transmission rate high by performing high bit rate modulation at time of good condition of the propagation environment.

As the modulation methods, there are BPSK (Binary Phase Shift Keying), QPSK (Quadrature Phase Shift Keying) and 16 QAM (16 Quadrature Amplitude Modulation) or the like. The number of bits that can be transmitted per one symbol in each modulation method is 1 bit in case of BPSK, 2 bits in case of QPSK and 4 bits in case of 16 QAM. And, the bit error rate characteristics in each modulation method deteriorate in the order of BPSK, QPSK and 16 QAM.

Accordingly, when the propagation environment of radio waves is bad, BPSK and QPSK which are the modulation methods having strong error tolerance are used. Further, when the propagation environment of radio waves is good, it gives priority to the transmission rate over the error tolerance, and for example, 16 QAM which indicates the double transmission rate of QPSK is used for the modulation method.

On the other hand, there is MPLS as technology for composing a network.

MPLS is technology which has introduced a concept of a label in order to realize flexible path control which is free from a framework of layer 3 in the network which is composed of routers. In other words, MPLS is technology which attaches a label to a place located in the middle of a data link header of layer 2 and an IP (Internet Protocol) packet header of layer 3, and transmits packets at high speed based on information included in the label. Therefore, MPLS can realize routing of packets which is not constrained by an IP address.

The traffic between edge nodes of MPLS is transmitted using a connection, called a label path (henceforth, referred to as LSP: Label Switched Path), which is a fixed path. Therefore, it can be said that MPLS has introduced connection-oriented mechanism into an IP network which is connectionless. And, MPLS can explicitly establish and control a path having an idle bandwidth more than a requested bandwidth using a signaling protocol in each link through which this LSP passes. As the signaling protocol, there is CR-LDP (Constraint-based Routed Label Distribution Protocol) and RSVP-TE (Resource Reservation Protocol Traffic Engineering) or the like. In other words, in MPLS, the technology which effectively uses bandwidth resources of the whole network and guarantees communication quality is specified.

MPLS calculates a path which is capable of providing a required bandwidth for communication using a path calculation algorithm which takes constraints of an available bandwidth or the like into account. The path obtained in this way is reserved in each of routers prior to performing communication. That is, the bandwidth corresponding to the path is secured in each of routers. As a result, the quality of communication is guaranteed and the bandwidth resources of the network are used more effectively.

The bandwidth control technology which controls a communication bandwidth while suppressing influence given to the communication in a communication system which is constructed by connecting radio devices corresponding to adaptive modulation and MPLS routers is disclosed in patent document 1 (Japanese Patent Application Publication No. 2006-287549). This technology solves such a problem that the data, which should be able to be transmitted with a reserved bandwidth, cannot be transmitted actually due to decrease of a communication bandwidth by adaptive modulation if adaptive modulation by the radio device is performed regardless of the communication bandwidth being reserved on the MPLS router.

The MPLS router disclosed in patent document 1 searches for an alternative path to which a communication path corresponding to the decreased amount of the communication bandwidth is to be diverted, when notification of a change in the modulation method to a low order is received from the radio device. And, when having found the alternative path, the MPLS router changes the modulation method in the original radio circuit while using the alternative path. Even if not found an alternative path, the modulation method is changed after performing disconnection of the communication path. In other words, when performing the change in the modulation method to a low order, when having found the alternative path, communication of the communication path which cannot be accommodated anymore due to the change in the modulation method to a low order is maintained via other adjacent MPLS routers. Also, even if not found an alternative path, it controls the communication bandwidth while suppressing influence given to the communication by performing release processing first to the communication path which cannot be accommodated any more due to the change in the modulation method to a low order.

Patent document 2 (domestic re-publication of PCT international publication for patent applications WO 2006001308) discloses a radio link system which can reconfigure a path depending on fluctuation of the bandwidth which occurs in association with a change in the propagation environment of the radio link. In this system, an arbitrary radio node device among a plurality of radio node devices detects the transmission state of its own radio link that is connected to itself, and changes the modulation method of the radio link based on the detected transmission state of the radio link. And, this radio node device transmits information indicating the changed modulation method and the number of paths using the radio link in which the modulation method has been changed to a path control device. The path control device detects a path which requires a path change based on the information indicating the modulation method and the number of paths using the radio link in which the modulation method has been changed transmitted from the radio node device, and determines a new path from the state of the whole radio links.

Further, an MPLS network has a restoration function which calculates an alternative path for fault relief to a fault occurring in the MPLS network and performs processing for establishing a new LSP. In the MPLS network, when a fault has occurred in a link which an LSP uses, information about the fault event is notified to an initiator node of the LSP. A Notify message of RSVP (Resource Reservation Protocol) is used for this notification, and by this, the fault event is notified directly from a node of the fault section to the initiator node which performs the fault relief. The initiator node which has received the Notify message calculates the alternative path and newly establishes an LSP. The fault relief processing method of MPLS network like this is disclosed in patent document 3 (Japanese Patent Application Publication No. 2005-333383).

Technology which patent document 3 discloses eliminates a possibility that a different path included in the fault section is selected as the alternative path, and it enables to perform the fault relief processing stably. According to this technology, when a fault has occurred at any path of the MPLS network, the Notify message which is fault event information is transmitted from a node which has detected the fault. When the Notify message is received, the node which performs the fault relief begins to measure protection time by using this reception as a trigger. During this protection time, LSA (Link State Advertisement) of a routing protocol of OSPF (Open Shortest Path First) is collected. When the protection time is completed, the node which performs the fault relief executes alternative path calculation based on the Notify message and LSA of OSPF, and performs the fault relief by performing the restoration processing.

PRIOR ART DOCUMENTS

Patent document

[Patent document 1] Japanese Patent Application Publication No. 2006-287549
[Patent document 2] domestic re-publication of PCT international publication for patent applications WO 2006001308
[Patent document 3] Japanese Patent Application Publication No. 2005-333383

SUMMARY OF INVENTION

Technical Problem

In a radio system adopting adaptive modulation, the transmission capacity and the communication quality are contrary elements each other. When the transmission capacity is increased, the error tolerance becomes low and the communication quality deteriorates. On the other hand, when the transmission capacity is decreased, the error tolerance becomes high and it improves the communication quality. Therefore, when attenuation of microwaves caused by a change in the weather has occurred, control is performed so as to secure the required communication quality and improve the error tolerance by decreasing the transmission capacity.

It will be described specifically with reference to FIGS. 12 to 14.

FIG. 12 is a network composed of radio node devices 1101-1106 which adopt adaptive modulation. A transmission line via the radio node device 1103 is established to the radio node device 1106 from the radio node device 1101. As the transmission line, a high priority data transmission line L101 and a low priority data transmission line L102 are established using VLAN (Virtual Local Area Network) and QoS (Quality of Service) or the like. Users transmit and receive communication data through these two kinds of data transmission lines.

When attenuation of microwaves has occurred due to a change in the weather or the like in the section (W104) between the radio node device 1103 and the radio node device 1105, each of the radio node devices 1103 and 1105 decreases the transmission capacity in order to secure the required communication quality.

FIG. 13 is a schematic diagram illustrating a problem when decreasing the transmission capacity as a result of adaptive modulation. FIG. 13(a) indicates the state of the data transmission line between the radio node device 1103 and the radio node device 1105 before adaptive modulation is performed, and FIG. 13(b) indicates the state of the data transmission line after performing adaptive modulation. In FIG. 13(a), communication bandwidths of both of the high priority data transmission line L101 and the low priority data transmission line L102 are secured. However, when adaptive modulation which decreases the transmission capacity is performed in order to secure the required communication quality in association with deterioration of the propagation environment, the communication bandwidths of both of the high priority data transmission line L101 and the low priority data transmission line L102 cannot be secured any more. Therefore, QoS control which preferentially secures a communication bandwidth of the high priority data transmission line L101 is performed. As a result, as shown in FIG. 13(b), the communication bandwidth of the low priority data transmission line L102 cannot be secured any more, and the data transmission line L102 is disconnected and the communication cannot be performed any more.

In the technology disclosed in patent document 1, an MPLS router searches for an alternative path to which the communication path corresponding to the decreased amount of the communication bandwidth is to be diverted, when notification of the change in the modulation method to a low order is received from the radio device. And communication of the communication path which cannot be accommodated any more is maintained via the alternative path.

Further, in the technology disclosed in patent document 2, with respect to fluctuation of the bandwidth which occurs in association with the change in the propagation environment of the radio link, information indicating a modulation method and the number of paths using the radio link in which the modulation method has been changed is transmitted to the path control device. The path control device detects a path which requires a path change based on the information, and determines a new path from the state of the whole radio links.

However, the technology disclosed in patent document 1 searches for an alternative path and performs changeover to the alternative path after having received the notice of change in the modulation method from a radio device. Also, the technology disclosed in patent document 2, similarly after having received the notice about radio link in which the modulation method has been changed, is performing control for detecting a path required for a required path change for it.

Accordingly, in both of the technology disclosed in patent document 1 and the technology disclosed in patent document 2, some data are discarded during a period from decreasing transmission capacity by adaptive modulation actually being performed to changeover traffics to the alternative path.

FIG. 14 is an explanation drawing showing the state that discontinuity of the data transmission line occurs in establishing the alternative path in this way.

This means that there is a problem that the risk of frequent occurrence of data discarding in a low priority data transmission line becomes high, because adaptive modulation operation is frequently performed in such a case where the propagation environment of the radio wave changes frequently due to frequent occurrences of the change in the weather or the like.

The object of the present invention is to provide a bandwidth guaranteed system, a radio node device and a bandwidth guaranteeing method which solve the above-mentioned problem, and can establish an alternative path without giving an influence on signal continuity for a data transmission line for which a communication bandwidth cannot be secured any more due to decrease in transmission capacity by adaptive modulation.

Solution to Problem

In order to realize the above-mentioned object, a bandwidth guaranteed system according to the present invention is characterized by including, a first radio node means, configuring an MPLS (MULTI PROTOCOL LABEL SWITCHING) network, which sets an adaptive modulation changeover margin having a predetermined width to communication quality for a trigger of performing adaptive modulation which decreases a communication bandwidth when the communication quality of a radio transmission channel section has deteriorated, and prior to performing the adaptive modulation, in the adaptive modulation changeover margin, instructs an initiator node which has established an LSP (Label Switched Path) in the radio transmission channel section to reserve a bandwidth of an alternative LSP for the LSP which requires restoration of diverting to an alternative path and to change over to the alternative LSP; and a second radio node means, configuring the MPLS network, which is the initiator node, and according to the instructions from the first radio node means, reserves a bandwidth of the alternative LSP, performs changeover to the alternative LSP and disconnects the LSP which has been changed over to the alternative LSP.

Further, a radio node device according to the present invention is characterized by including, a radio section state monitoring means which monitors communication quality of a radio transmission channel section, and outputs communication quality status information; an adaptive modulation control means which performs adaptive modulation which decreases a communication bandwidth of the radio transmission channel section when the communication quality status information outputted by the radio section state monitoring means has reached an adaptive modulation threshold value which is set in advance and becomes a trigger of performing the adaptive modulation; and a restoration control means which when the communication quality status information outputted by the radio section state monitoring means has reached a predetermined threshold value before reaching the adaptive modulation threshold value, instructs an initiator node which has established an LSP (Label Switched Path) of an MPLS (MULTI PROTOCOL LABEL SWITCHING) network in the radio transmission channel section to reserve a bandwidth of an alternative LSP for the LSP which requires restoration of diverting to an alternative path and to change over to the alternative LSP.

Further more, a bandwidth guaranteeing method in an MPLS network adopting adaptive modulation according to the present invention is characterized by including, setting an adaptive modulation changeover margin having a predetermined width to communication quality of a radio transmission channel section; prior to performing the adaptive modulation, in the adaptive modulation changeover margin, according to a deterioration condition of the communication quality, reserving a bandwidth of an alternative LSP for establishing an alternative path by restoration to an LSP being established in the radio transmission channel section; and continuing communication by performing changeover to the alternative path using the alternative LSP.

Advantageous Effects of Invention

The present invention can establish an alternative path without giving an influence on signal continuity for a data transmission line for which a communication bandwidth cannot be secured any more, even when the transmission capacity has decreased by performing adaptive modulation in association with deterioration of the propagation environment of the radio transmission channel section.

BRIEF DESCRIPTION OF DRAWINGS

[FIG. 14] is an explanation drawing which explains a problem to be solved by the invention, and is a drawing showing the state that discontinuity of the data transmission line occurs in establishing the alternative path.

DESCRIPTION OF EMBODIMENTS

Figure 1:
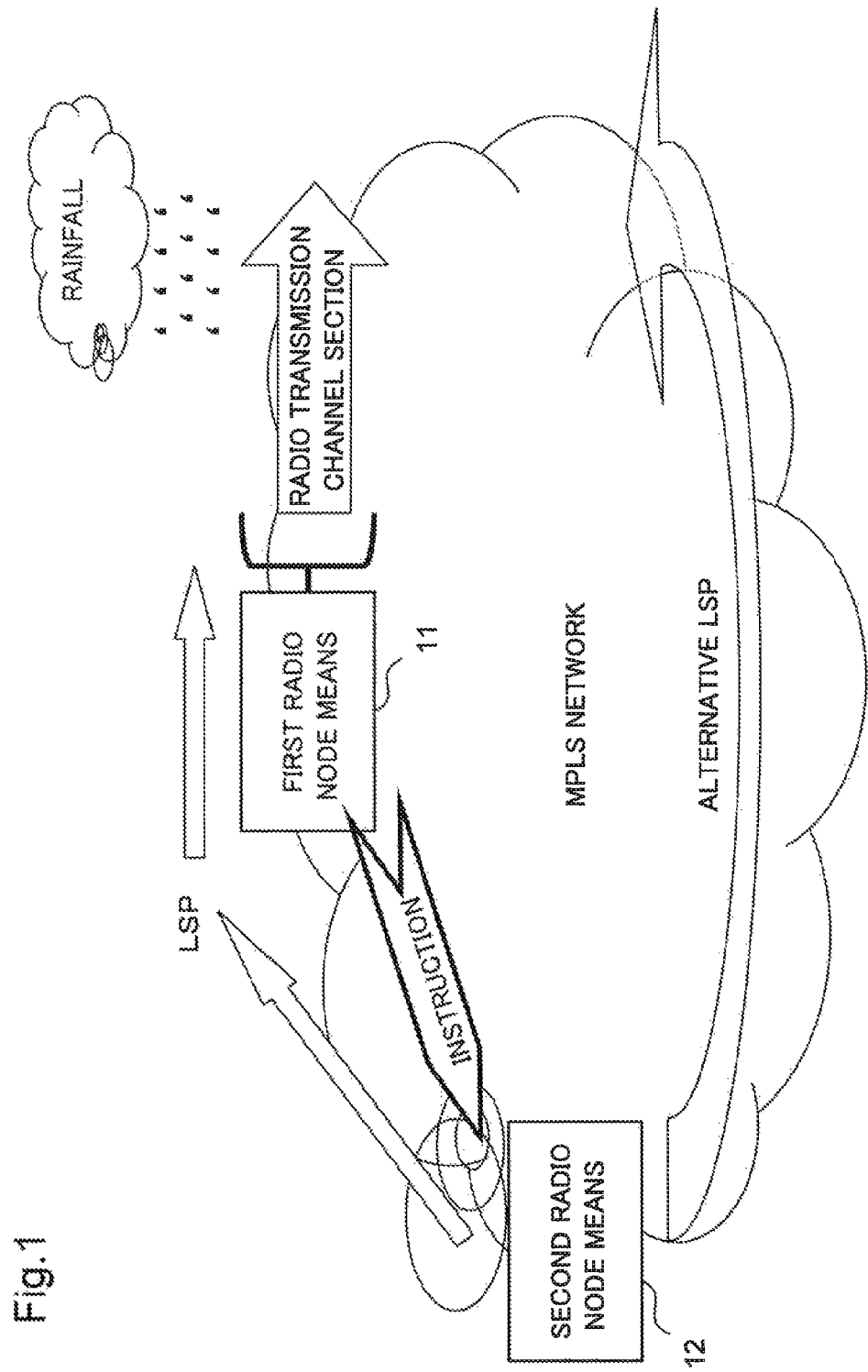
[FIG. 1] is a system configuration drawing showing a basic exemplary embodiment of the present invention.

FIG. 1 is a system configuration drawing showing a basic exemplary embodiment for realizing a bandwidth guaranteed system of the present invention.

A bandwidth guaranteed system of a basic exemplary embodiment according to the present invention sets an adaptive modulation changeover margin having a predetermined width to communication quality which becomes a trigger of performing adaptive modulation which decreases a communication bandwidth when the communication quality of a radio transmission channel section has deteriorated. And, a first radio node device 11 and a second radio node device 12 configure the MPLS network. The first radio node means 11, prior to performing the adaptive modulation, in the adaptive modulation changeover margin, instructs an initiator node which has established an LSP in the radio transmission channel section to reserve a bandwidth of an alternative LSP for the LSP which requires restoration of diverting to an alternative path and to change over to the alternative LSP. The second radio node means 12, that is the above-mentioned initiator node, according to the instructions from the first radio node means, reserves a bandwidth of the alternative LSP, performs changeover to the alternative LSP and disconnects the LSP which has been changed over to the alternative LSP.

A bandwidth guaranteeing method of this basic exemplary embodiment is a bandwidth guaranteeing method in the MPLS network adopting adaptive modulation, and sets an adaptive modulation changeover margin having a predetermined width to communication quality of a radio transmission channel section. And, prior to performing the adaptive modulation, in the adaptive modulation changeover margin, according to a deterioration condition of the communication quality, performs the following processing. Firstly, it reserves a bandwidth of an alternative LSP for establishing an alternative path by restoration for an LSP being established in the radio transmission channel section. Then, it continues communication by performing changeover to the alternative path using the alternative LSP.

Here, the restoration is processing or function performed by a node device configuring the MPLS network which calculates an alternative path for a fault occurred in the MPLS network and newly establishes an LSP for the fault relief.

The basic exemplary embodiment of the present invention sets the adaptive modulation changeover margin to the communication quality that becomes a trigger of performing the adaptive modulation. And, it performs the restoration by the processing during this changeover margin. Therefore, it is possible to perform changeover a path without giving an influence on signal continuity because it can divert a path to the alternative LSP before the bandwidth capacity of the transmission line decreases.

The exemplary embodiment of the present invention will be further described with reference to drawings.

Figure 2:
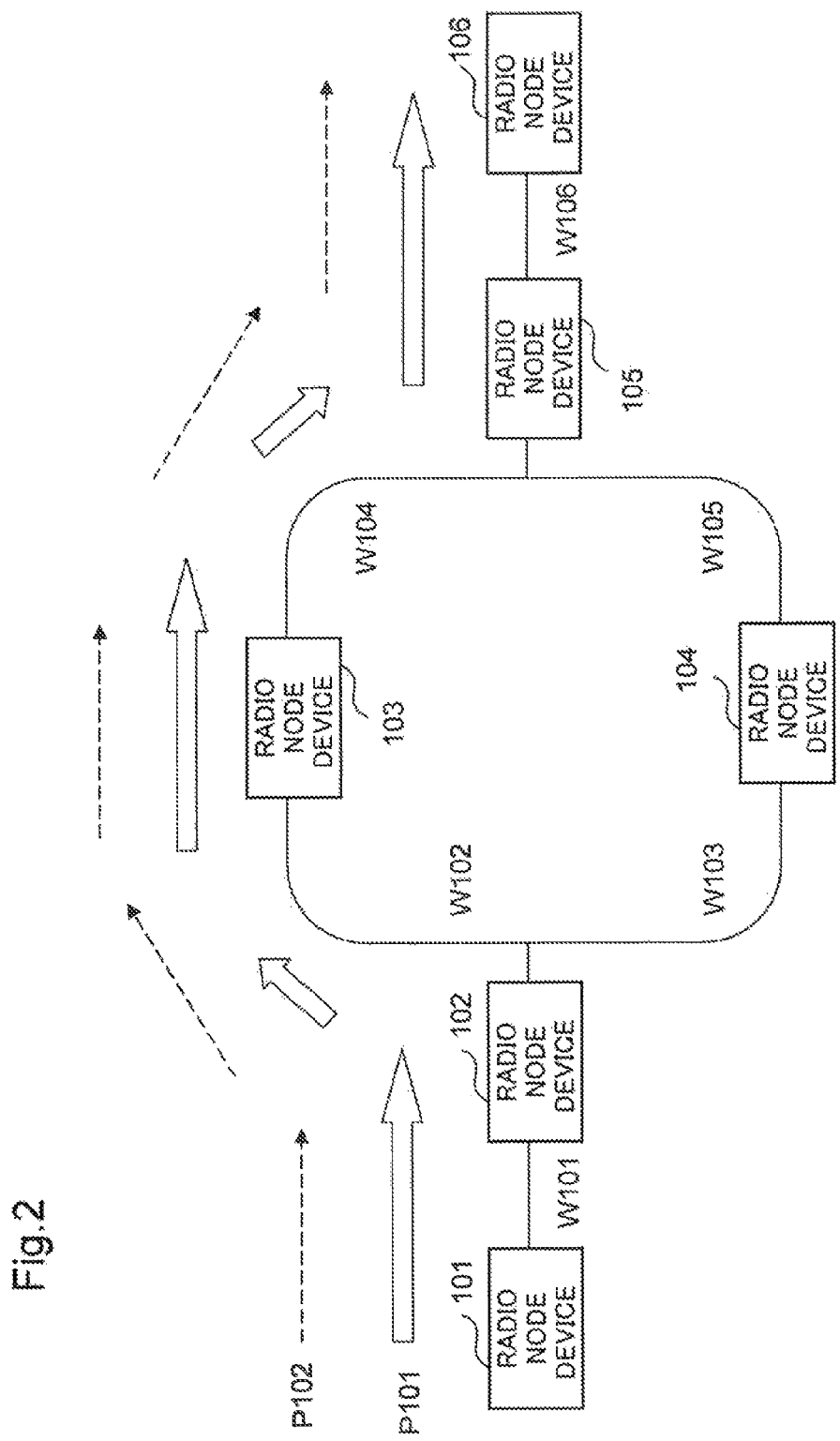
[FIG. 2] is a system configuration drawing showing an MPLS network including radio node devices corresponding to adaptive modulation in an exemplary embodiment of the present invention.

FIG. 2 is a system configuration drawing of the exemplary embodiment according to the present invention showing an MPLS network which is composed on radio node devices 101-106 adopting adaptive modulation. An LSP as a data transmission line via the radio node devices 102, 103 and 105 is established to the radio node device 106 which is a terminator node (Terminator) from the radio node device 101 which is an initiator node (Initiator). A high priority data transmission line P101 and a low priority data transmission line P102 are established in the LSP using VLAN and QoS or the like. Users transmit and receive communication data through these two kinds of data transmission lines.

Each radio node device performs the label switching and the traffic management based on the specification of MPLS. Further, each radio node device monitors fluctuation or the like of the bit error rate in respective radio links W101-W106 between each of adjacent radio node devices, and performs adaptive modulation which makes the modulation multiple value number increase or decrease according to a change in the propagation environment of the radio waves.

Figure 3:
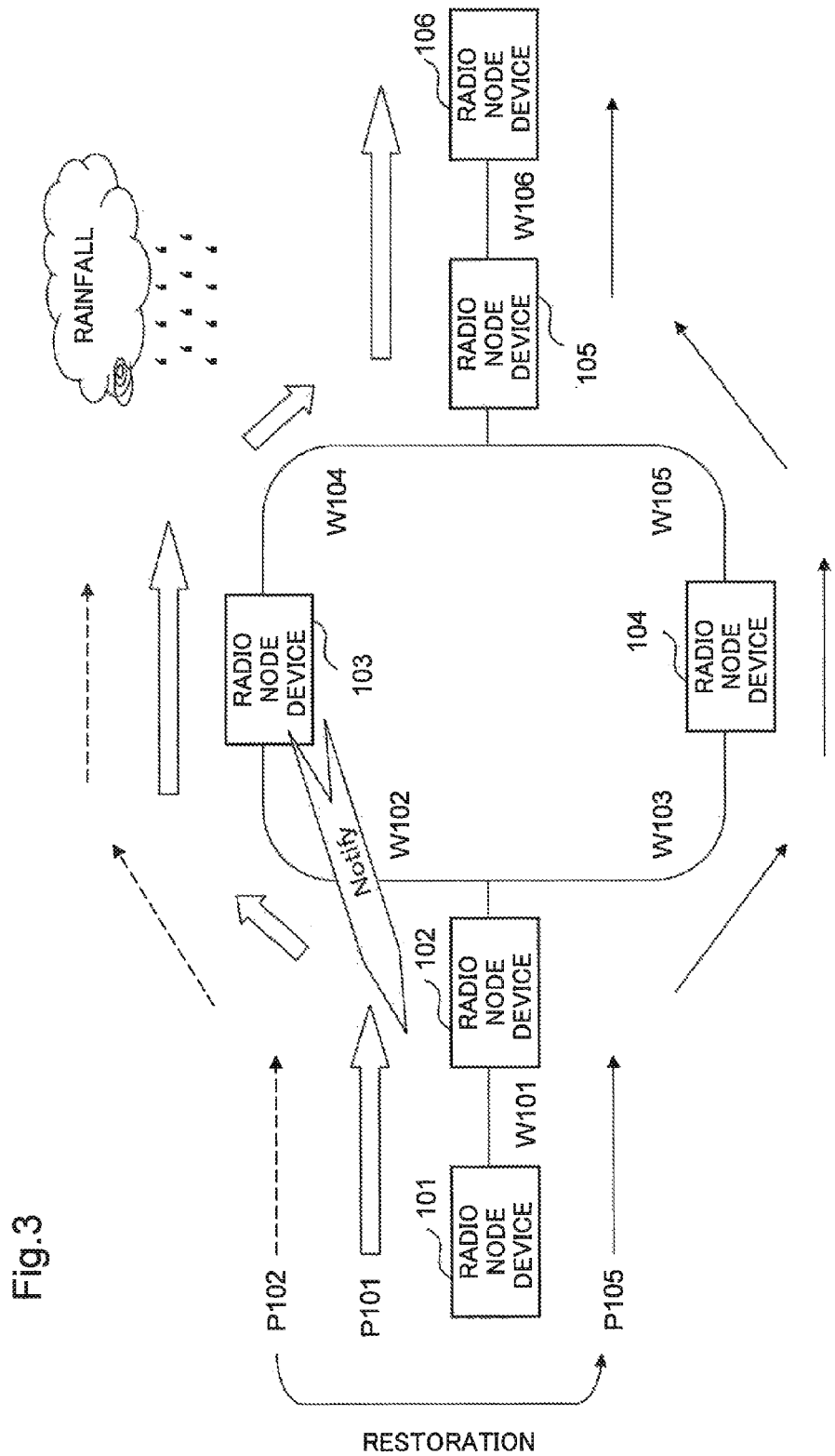
[FIG. 3] is a system configuration drawing showing the state that an alternative LSP is established by a restoration function of MPLS.

FIG. 3 is a system configuration drawing showing the state that an alternative LSP is established by a restoration function of MPLS.

It indicates the situation that a change in the propagation environment of the radio waves occurs due to rainfall in the radio link W104 of the MPLS network shown in FIG. 2, and the radio node device 103 and the radio node device 105 perform adaptive modulation.

When an LSP exists for which a communication bandwidth cannot be secured any more by performing adaptive modulation, the radio node device 103 transmits a Notify message to the initiator node which has established the LSP, and instructs to perform the restoration for performing fault relief. The radio node device 101 which is the initiator node of the LSP calculates an alternative path for the fault relief, and newly establishes the data transmission line P105 as an alternative LSP.

Further, although the radio node device 105 which is opposite to the radio node device 103 performs the same processing as the radio node device 103 to an LSP in an opposite direction which is not illustrated, for the sake of making explanation simple, only processing for the LSP in the illustrated direction will be described.

In this exemplary embodiment, the present invention has a feature in control operation performed by the radio node device 103, which monitors the state of the radio link W104, according to the change in the propagation environment before actually performing adaptive modulation. Description will be made later of this control operation.

Figure 4:
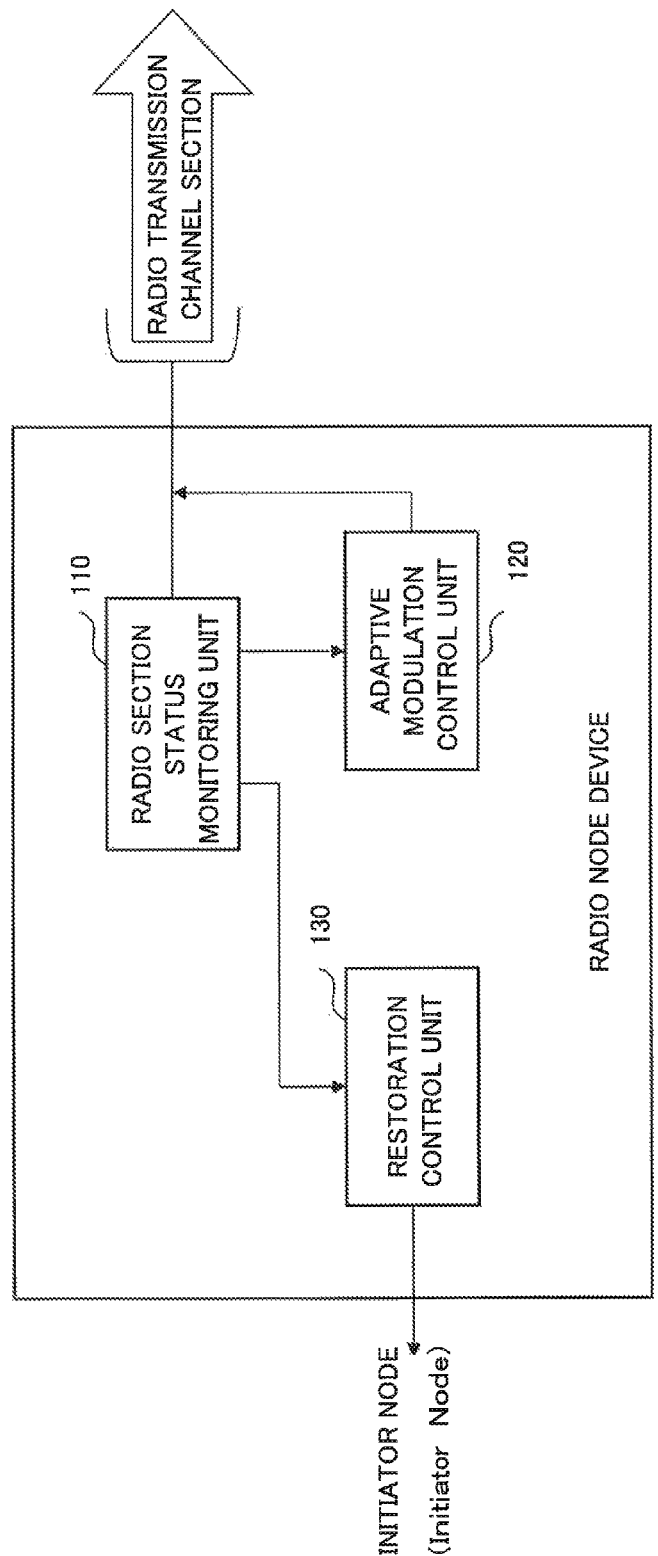
[FIG. 4] is a block diagram showing a main configuration of the radio node device corresponding to adaptive modulation according to the exemplary embodiment of the present invention.

FIG. 4 is a block diagram showing a main configuration of the radio node device 100 corresponding to adaptive modulation according to the exemplary embodiment of the present invention. Further, the radio node device 100 is a device which represents the first radio node means 11 and the second radio node means 12 shown in FIG. 1, and the radio node devices 101-106 shown in FIG. 2 and FIG. 3.

The radio node device 100 is configured by including a radio section status monitoring unit 110, an adaptive modulation control unit 120 and a restoration control unit 130.

The radio section status monitoring unit 110 monitors the communication quality of the radio transmission channel section and outputs communication quality status information. In other words, the radio section status monitoring unit 110 has a function to monitor the propagation state of radio waves which is the transmission line state in the radio transmission channel section managed by this radio node device 100. The propagation state of radio waves is judged, for example, using the bit error rate. The radio section status monitoring unit 110 detects the bit error rate, and may output only the value of this bit error rate. Also, the radio section status monitoring unit 110 discriminates whether the transmission line state has exceeded the various threshold values that will be mentioned later or not based on the detected bit error rate value, and when exceeding the respective threshold values, it may output corresponding information which indicates that it has exceeded the respective threshold values.

The adaptive modulation control unit 120 has a function to control adaptive modulation by a modulation method corresponding to the change in state of the radio transmission channel section based on the information outputted by the radio section status monitoring unit 110. When the communication quality status information outputted by the radio section status monitoring unit 110 has reached a predetermined adaptive modulation threshold value which becomes a trigger of performing adaptive modulation which decreases a communication bandwidth of the radio transmission channel section, the adaptive modulation control unit 120 performs the adaptive modulation.

The restoration control unit 130 has a function to perform restoration control according to the transmission line state in the radio transmission channel section based on the information outputted by the radio section status monitoring unit 110. When the communication quality status information outputted by the radio section status monitoring unit 110 has reached a predetermined threshold value which is a value before reaching the adaptive modulation threshold value, the restoration control unit 130 performs the restoration control. As will be mentioned later, for an LSP which requires the restoration among the LSPs of MPLS network established in the radio transmission channel section, the restoration control unit 130 instructs the initiator node of the LSP to reserve a bandwidth of an alternative LSP and to perform changeover to the alternative LSP successively.

Figure 5:
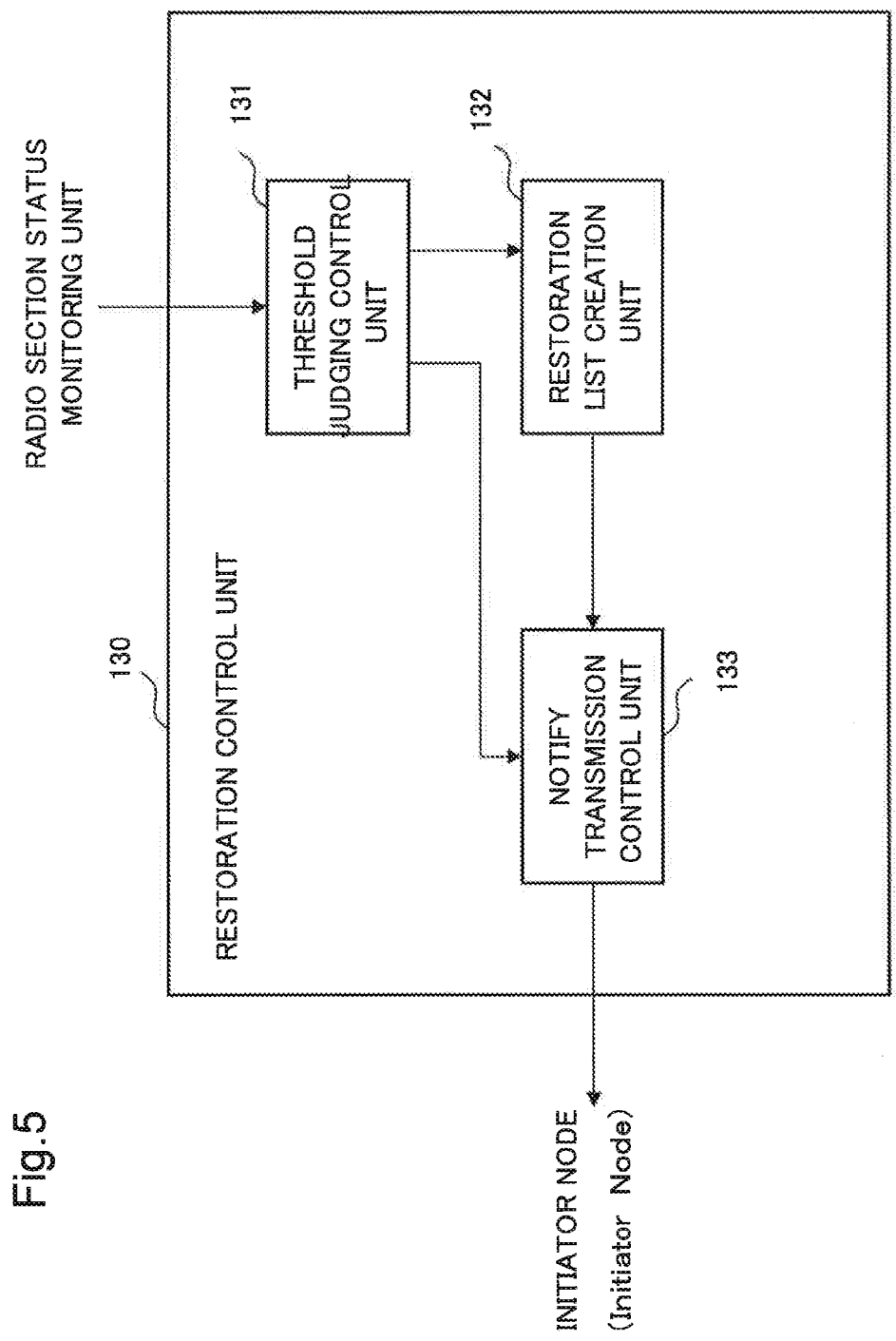
[FIG. 5] is a block diagram showing a configuration of a restoration control unit of the radio node device.

FIG. 5 is a block diagram showing a configuration of the restoration control unit 130 of the radio node device 100. The restoration control unit 130 is configured by including a threshold judging control unit 131, a restoration list creation unit 132 and a Notify transmission control unit 133.

The threshold judging control unit 131 has a function to discriminate in what state the transmission line state in the radio transmission channel section is based on the information outputted by the radio section status monitoring unit 110. And, the threshold judging control unit 131 discriminates the transmission line state which becomes a trigger of various kinds of control, and outputs information corresponding to the discriminated state.

The restoration list creation unit 132 has a function to create a restoration list and a stay list which will be mentioned later based on the information outputted by the threshold judging control unit 131. The restoration list creation unit 132 outputs information relating to the LSP which is an object of fault relief based on the created restoration list.

Further, the restoration list is a list which registers an object LSP of restoration when a communication bandwidth of the radio transmission channel section has decreased by adaptive modulation. Further, the stay list is a list which registers an object LSP which continues its communication as it is even if a communication bandwidth of the radio transmission channel section has decreased by adaptive modulation.

The Notify transmission control unit 133 has a function to perform control for transmitting a Notify message to an initiator node which has established the object LSP of fault relief based on the information outputted by the threshold judging control unit 131 and the information outputted by the restoration list creation unit 132.

Operation of the exemplary embodiment of the present invention in the system configuration and the device configuration described above will be described in detail with reference to FIGS. 6 to 9.

Figure 6:
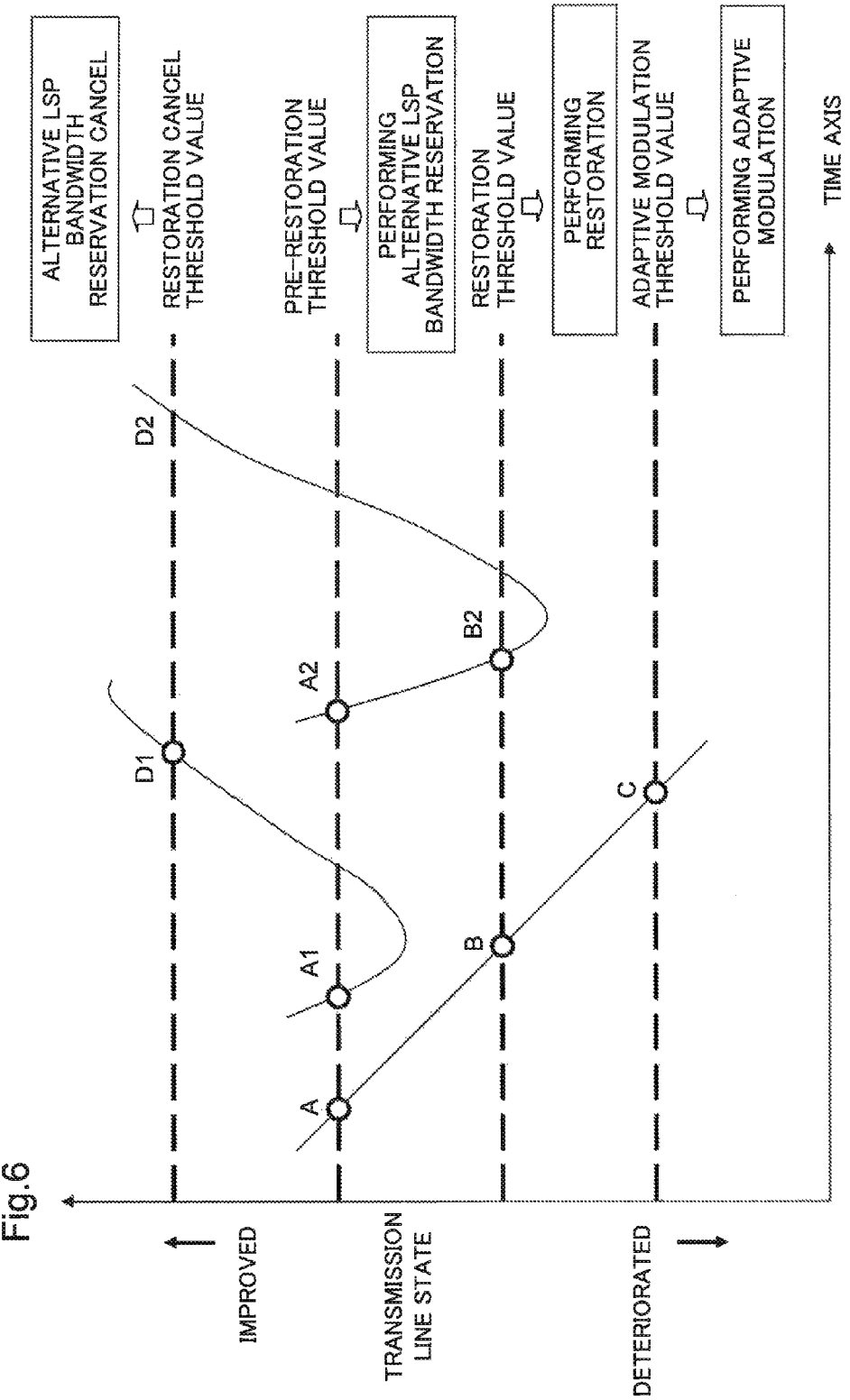
[FIG. 6] is an explanation drawing showing a relation among various threshold values used in the exemplary embodiment of the present invention.

FIG. 6 is an explanation drawing showing a relation of a first threshold value to a fourth threshold value used in the exemplary embodiment of the present invention for discriminating the state of the radio transmission channel section.

The first threshold value is a threshold value (the pre-restoration threshold value) for performing evacuation preparation of an LSP, for which a communication bandwidth cannot be secured any more when adaptive modulation is performed, by reserving a bandwidth of an alternative LSP for the LSP.

The second threshold value is a threshold value (the restoration threshold value) for performing actual restoration which makes a path divert to the alternative LSP for which a bandwidth has been reserved.

The third threshold value is a threshold value (the adaptive modulation threshold value) for actually performing adaptive modulation which decreases a communication bandwidth of the radio transmission channel section.

The fourth threshold value is a threshold value (the restoration cancellation threshold value) for canceling the alternative LSP for which a bandwidth has been reserved when the transmission line state is improved after performing bandwidth reservation by detection of the pre-restoration threshold value.

The margin between the pre-restoration threshold value and the adaptive modulation threshold value is called an adaptive modulation changeover margin.

Referring to FIG. 6, when the pre-restoration threshold value A is detected, the radio node device 100 calculates whether the restoration of LSP is needed or not taking a bandwidth required for the LSP currently being established and the priority order into account before decreasing a communication bandwidth by performing adaptive modulation. When the restoration of LSP is needed, it transmits a Notify message to the initiator node of the LSP and instructs to perform bandwidth reservation for an alternative LSP.

Next, the radio node device 100 which has detected the restoration threshold value B instructs the initiator node, to which bandwidth reservation for the alternative LSP was instructed, to execute the restoration for making a path divert to the alternative LSP. As a result, the original LSP for which the restoration to alternative LSP has been performed is disconnected.

Further next, the radio node device 100 which has detected the adaptive modulation threshold value C performs adaptive modulation and decreases a communication bandwidth of the radio transmission channel section.

On the other hand, referring to FIG. 6, the radio node device 100 which has detected the restoration cancellation threshold value D1 after detecting the pre-restoration threshold value A1 because of the transmission line state improvement instructs the initiator node, to which bandwidth reservation for the alternative LSP was instructed, to cancel the restoration.

Further, referring to FIG. 6, the radio node device 100, which had detected the pre-restoration threshold value A2, and further detected the restoration threshold value B2, instructs the initiator node of LSP to reserve a bandwidth of the alternative LSP and to execute the restoration. Therefore, the LSP used to be the object has already been disconnected, and data communication is performed by having diverted a path to the alternative LSP. Accordingly, the radio node device 100 does not perform anything, even if the transmission line state improves and the restoration cancellation threshold value D2 is detected after such state.

Further, the radio section status monitoring unit 110 may judge these threshold values by holding corresponding information on the value of the bit error rate and each threshold value in the radio section status monitoring unit 110. Further, only with the radio section status monitoring unit 110 outputting the value of the detected bit error rate, the restoration control unit 130 and the adaptive modulation control unit 120 may discriminate the threshold value required for each control. In the latter case, the restoration control unit 130 and the adaptive modulation control unit 120 hold corresponding information on the value of the bit error rate and each required threshold values.

Figure 7:
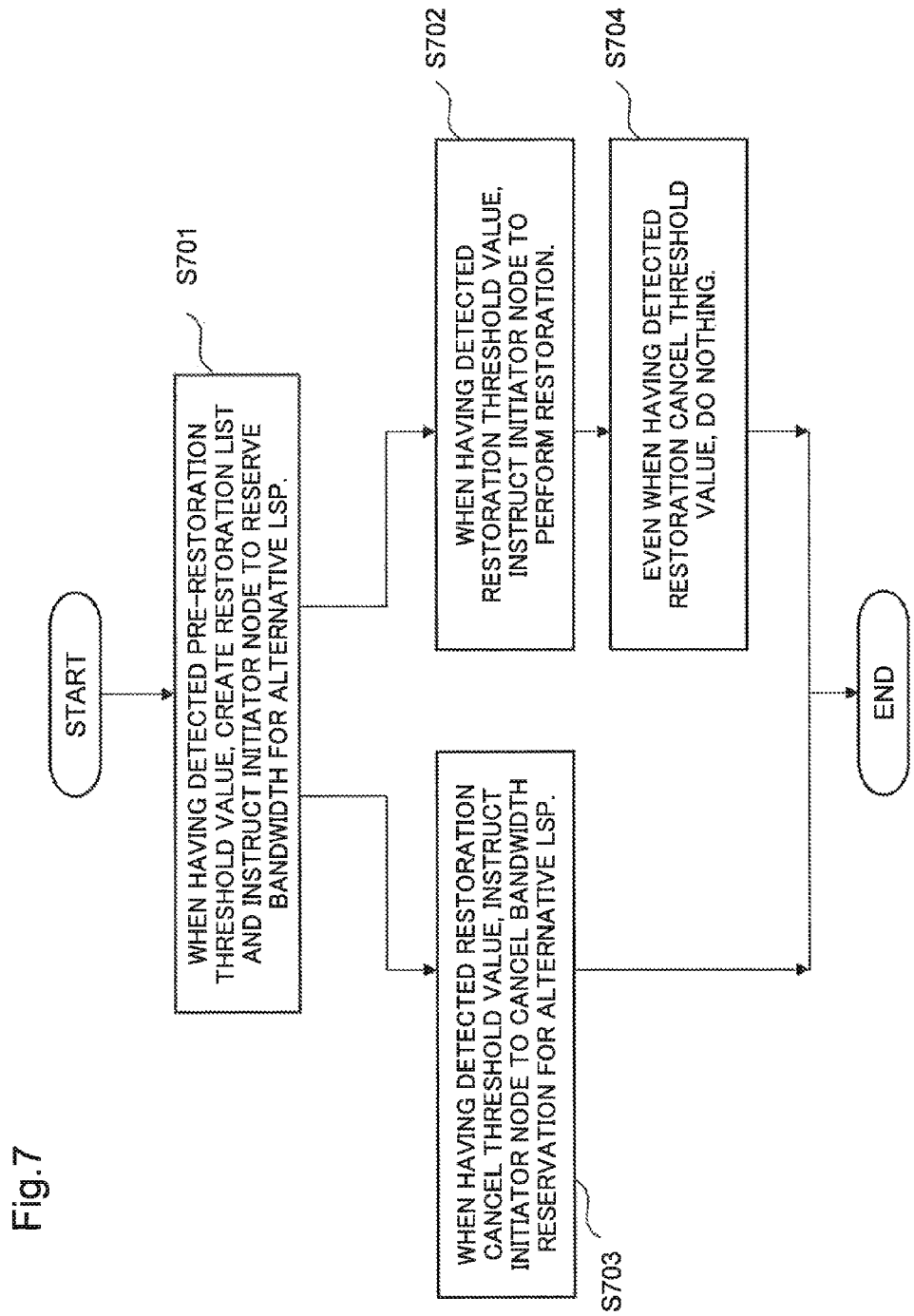
[FIG. 7] is a flow chart showing an outline of operation of the restoration control unit.

FIG. 7 is a flow chart showing the outline of operation of a restoration control unit 130.

The threshold judging control unit 131 of the restoration control unit 130 discriminates the transmission line state in the radio transmission channel section based on the information outputted by the radio section status monitoring unit 110, and when having detected the pre-restoration threshold value, this triggers commencement of the control operation.

Operation of Step S701 will be described. The threshold judging control unit 131 instructs the restoration list creation unit 132, when having detected the pre-restoration threshold value, to create a restoration list. Also, the threshold judging control unit 131 notifies the Notify transmission control unit 133 of the effect that the pre-restoration threshold value has been detected.

As will be described in detail later, the restoration list creation unit 132 creates the restoration list by confirming existence of the LSP which becomes an object of restoration taking a bandwidth required for the LSP currently being established and the priority order into account. When the object LSP of restoration exists, the restoration list creation unit 132 instructs the Notify transmission control unit 133 to transmit a Notify message. At this time, the restoration list creation unit 132 notifies the Notify transmission control unit 133 of LSP information including an LSP identifier of the object LSP which exists in the restoration list.

The Notify transmission control unit 133 transmits the Notify message to the initiator node of the LSP based on the detection information of the pre-restoration threshold value notified from the threshold judging control unit 131 and the LSP information notified from the restoration list creation unit 132. The Notify message transmitted at that time instructs bandwidth reservation for an alternative LSP.

Next, operation of Step S702 will be described.

Step S702 is an operation in a case where the threshold judging control unit 131 is discriminating the transmission line state in the radio transmission channel section based on information continuously outputted by the radio section status monitoring unit 110, and has detected the restoration threshold value.

The threshold judging control unit 131 notifies the restoration list creation unit 132 and the Notify transmission control unit 133 of the effect that it has detected the restoration threshold value, respectively.

The restoration list creation unit 132 notifies the Notify transmission control unit 133 of LSP information of the LSP which exists in the restoration list and becomes an object of restoration.

The Notify transmission control unit 133 transmits the Notify message to the initiator node of the LSP based on the detection information of the restoration threshold value notified from the threshold judging control unit 131 and the LSP information notified from the restoration list creation unit 132. The Notify message transmitted at this time instructs execution of the restoration to the alternative LSP.

Next, operation of Step S703 will be described. Step S703 is an operation in a case where the threshold judging control unit 131 detects the restoration cancellation threshold value after execution of controlling Step S701 by detecting the pre-restoration threshold value. In other words, operation of Step S703 is carried out when improvement of the transmission line state of the radio transmission channel section is discriminated in the discrimination operation of the transmission line state in the radio transmission channel section which is continuously being performed based on outputted information by the radio section status monitoring unit 110.

The threshold judging control unit 131 notifies the restoration list creation unit 132 and the Notify transmission control unit 133 of the effect that it has detected the restoration cancellation threshold value.

The restoration list creation unit 132 notifies the Notify transmission control unit 133 of LSP information of the LSP which exists in the restoration list and is to be an object of restoration.

The Notify transmission control unit 133 transmits the Notify message to the initiator node of the LSP based on the detection information of the restoration cancellation threshold value notified from the threshold judging control unit 131 and the LSP information notified from the restoration list creation unit 132. The Notify message transmitted at this time instructs cancellation of bandwidth reservation for the alternative LSP instructed in Step S701.

Step S704 is an operation in a case where improvement of the transmission line state in the radio transmission channel section is discriminated after execution of the restoration by detecting the restoration threshold value.

The restoration was performed in Step S702, and the LSP used to be the object was diverted to the alternative LSP by the initiator node, and the original LSP has already been disconnected. Therefore, even if the restoration cancellation threshold value is detected, no control operation is performed.

Also, in this case, the threshold judging control unit 131 notifies the restoration list creation unit 132 and the Notify transmission control unit 133 of the effect that it has detected the restoration cancellation threshold value.

Because the restoration list creation unit 132 can discriminate that the restoration has already been performed, it ignores this detection notification of the restoration cancellation threshold value.

Further, while the Notify transmission control unit 133 receives the notice of detection of the restoration cancellation threshold value from the threshold judging control unit 131, it ignores this detection notification of the restoration cancellation threshold value because it does not receive information from the restoration list creation unit 132.

Performing as above, the restoration control unit 130 controls the restoration according to the transmission line state in the radio transmission channel section based on the information outputted by the radio section status monitoring unit 110.

Further, although the above-mentioned description is based on the configuration of the restoration control unit 130 shown in FIG. 5, it does not need to operate as these necessarily. For example, the threshold judging control unit 131 may notify only the restoration list creation unit 132 of the discrimination information on the threshold value, and the restoration list creation unit 132 may notify the Notify transmission control unit 133 of information which instructs the control operation to be performed.

In this case, the restoration list creation unit 132 which has received the detection notice of the pre-restoration threshold value creates the restoration list first. Then, the restoration list creation unit 132 instructs the Notify message transmission control unit 133 to transmit the Notify message, together with the LSP information existing there, to instruct bandwidth reservation for the alternative LSP.

Further, the restoration list creation unit 132 which has received the detection notice of the restoration threshold value instructs the Notify message transmission control unit 133 to transmit the Notify message, together with the LSP information of the object, to instruct execution of the restoration to the alternative LSP.

Further, the restoration list creation unit 132 which has received the detection notice of the restoration cancellation threshold value discriminates whether it had received the detection notice of the restoration threshold value or not. When it had not received the detection notice of the restoration threshold value, the restoration list creation unit 132 instructs the Notify message transmission control unit 133 to transmit the Notify message to instruct cancellation of bandwidth reservation for the alternative LSP. When it had received the detection notice of the restoration threshold value, the restoration list creation unit 132 ignores this detection notification of the restoration cancellation threshold value.

Further, the initiator node (the radio node device 101 of FIG. 3) which was instructed bandwidth reservation for the alternative LSP in the operation of above-mentioned Step S701 performs alternative path calculation to the terminator node (the radio node device 106 of FIG. 3) based on the network of current state when it receives the Notify message. In that case, the initiator node (the radio node device 101) performs the path calculation by excluding (exclusion) the path including the radio transmission channel section (W104 of FIG. 3) which is subject to be notified by the Notify message. By the above process, a section whose bandwidth capacity has decreased may not be selected again. The initiator node (the radio node device 101 of FIG. 3) performs bandwidth reservation for the alternative LSP (P105 of FIG. 3) based on the result of the path calculation. When the bandwidth reservation for the alternative LSP is failed, the initiator node searches for another alternative path again and performs re-establishment of a different alternative LSP.

Figure 8:
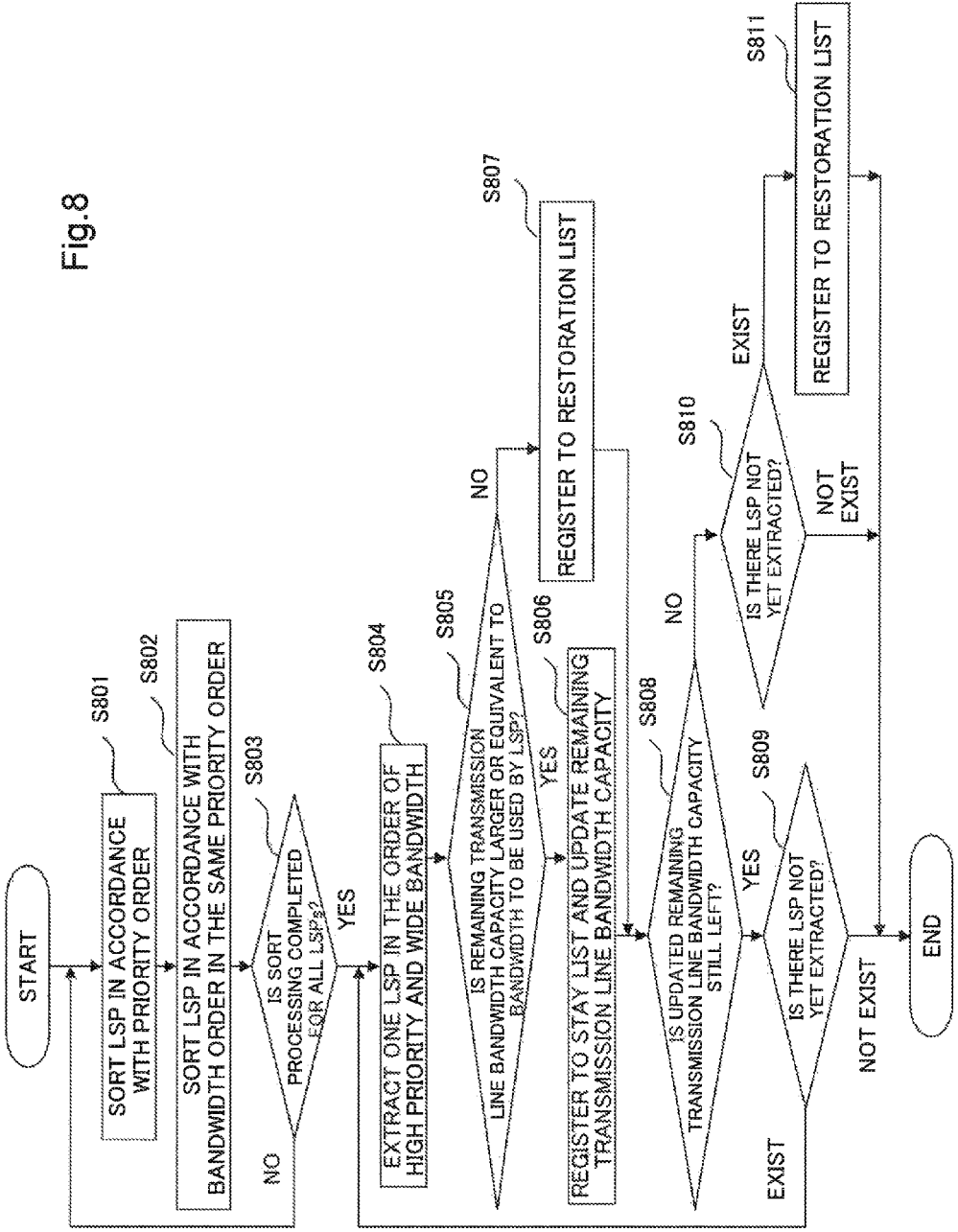
[FIG. 8] is a flowchart showing operation relating to restoration list creation.

FIG. 8 is a flow chart showing operation relating to creation on the restoration list executed in the restoration list creation unit 132.

The restoration list creation unit 132 starts this operation by receiving the detection notice of the pre-restoration threshold value from the threshold judging control unit 131.

The restoration list creation unit 132 creates a stay list and a restoration list taking a bandwidth required for the LSP currently being established and the priority order into account. The stay list is a list which registers an object LSP which continues its communication as it is even if a communication bandwidth of the radio transmission channel section has decreased by adaptive modulation. Further, the restoration list is a list which registers an object LSP of restoration when a communication bandwidth of the radio transmission channel section has decreased by adaptive modulation. The restoration list includes LSP information which includes a LSP identifier of the object LSP and a flag or the like which shows yes or no indication of reservation execution for the alternative LSP based on detection of the pre-restoration threshold value.

The operation of Steps S801 to S803 is a sort processing which rearranges the order of the LSPs currently being established in accordance with the priority order and the use bandwidth order. By this processing, the processing to confirm existence of the LSP which is the object of restoration is successively performed from the LSP having high priority and using wide bandwidth.

Operation after Step S804 will be described for each step.

Step S804 extracts one piece of information on the LSP, among the LSPs currently being established, which is using wide bandwidth by high priority of the first order as a result of the above-mentioned sort processing.

Step S805 checks the magnitude correlation between the remaining transmission line bandwidth capacity which is the decreased bandwidth capacity after executing adaptive modulation and the bandwidth to be used by this LSP.

When the remaining transmission line bandwidth capacity is larger or equivalent in this check, the transmission capacity of the LSP can be maintained (YES of S805) even if a communication bandwidth of the radio section decreased by execution of adaptive modulation. Therefore, this LSP is registered to the stay list. When the LSP is registered to the stay list, the bandwidth capacity to be used by this LSP is subtracted from the remaining transmission line bandwidth capacity, and the remaining transmission line bandwidth capacity is updated (S806).

On the other hand, as a result of the check of Step S805, when the remaining transmission line bandwidth capacity is smaller, the transmission capacity of the LSP cannot be maintained any more (NO of S805) when a communication bandwidth of the radio transmission channel section decreases by execution of adaptive modulation. Therefore, this LSP is made the object of restoration and registered to the restoration list (S807). It is not necessary to update the remaining transmission line bandwidth capacity when the LSP is registered to the restoration list.

Step S808 judges whether the remaining transmission line bandwidth capacity updated in Step S806 is still left or not. When the remaining transmission line bandwidth capacity is still left by this judgment (NO of S808), it judges in Step S809 whether the assigning processing to the stay list or the restoration list mentioned above is completed or not for the LSPs currently being established.

When the above-mentioned processing to all LSPs currently being established is not completed (exist of S809), it returns to Step S804, extracts one piece of information on the LSP using wide bandwidth by high priority of the next order, and Steps S805 to S809 mentioned above are repeated. Further, when the above-mentioned processing to all LSPs currently being established has been completed (not exist of S809), it ends this restoration list creation processing.

On the other hand, as a result of the judgment of Step S808, when the remaining transmission line bandwidth capacity updated in Step S806 is no longer left (YES of S808), the following processing is performed. It is judged in Step S810 whether the assigning processing to the stay list or the restoration list mentioned above is completed or not for the LSPs currently being established.

When the above-mentioned processing to all LSPs currently being established is not completed (exist of S810), all the remaining LSPs are registered to the restoration list (S811). In other words, it is because the transmission capacity for all remaining LSPs cannot be maintained any more due to no remaining transmission line bandwidth capacity.

Further, when the above-mentioned processing to all LSPs currently being established has been completed (not exist of S810), it ends this restoration list creation processing.

Performing as above, the restoration list creation unit 132 creates the stay list and the restoration list taking a bandwidth required to the LSP currently being established and the priority order into account.

Operation of the radio node device according to the exemplary embodiment of the present invention will be described with reference to FIG. 9 based on the contents described above.

Figure 9:
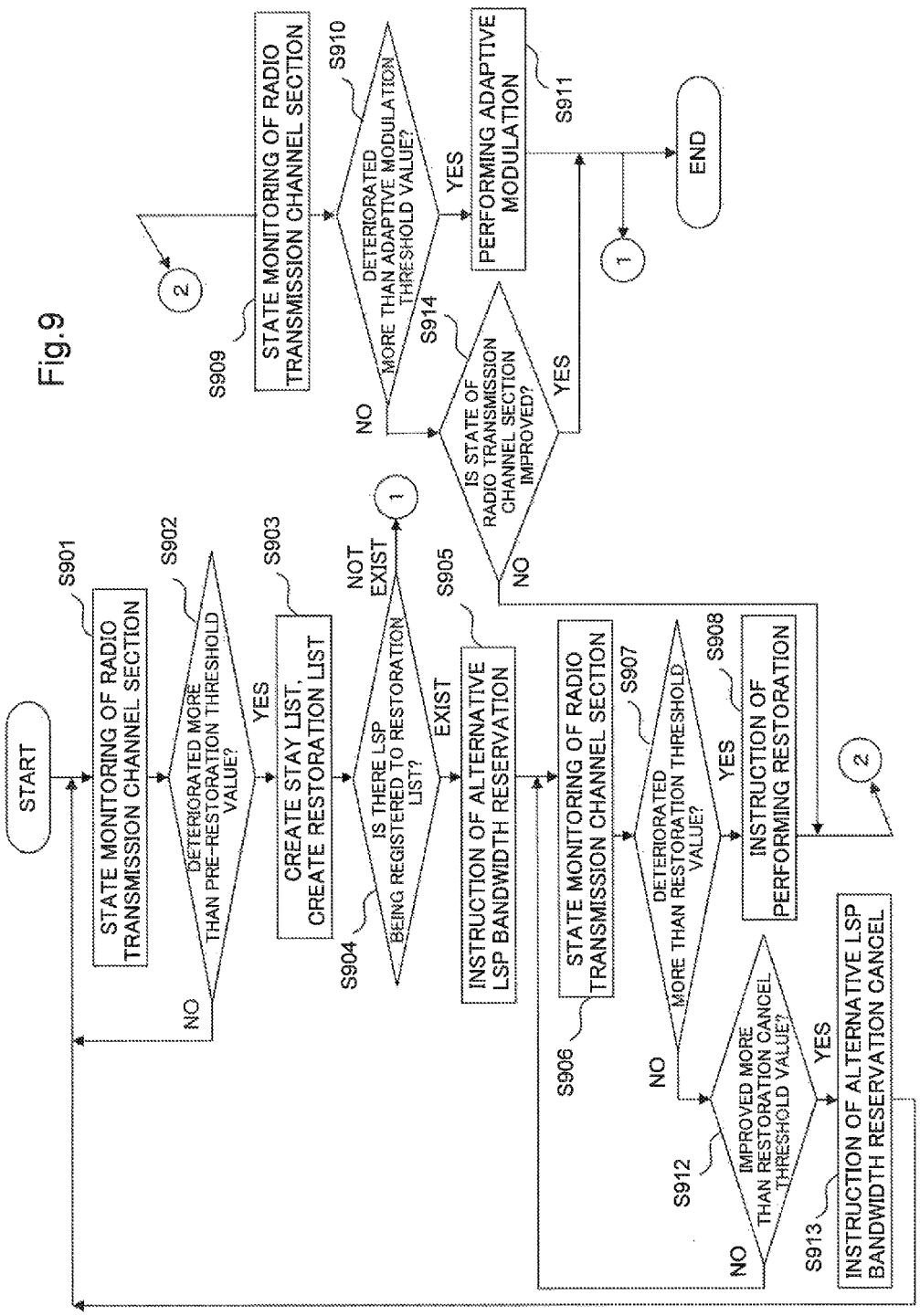
[FIG. 9] is a flow chart showing operation of the radio node device according to the exemplary embodiment of the present invention.

FIG. 9 is a flow chart showing operation of the radio node device according to the exemplary embodiment of the present invention.

As has been described in FIG. 4, the radio section status monitoring unit 110 monitors the transmission line state in the radio transmission channel section in the radio node device 100 (S901). And, the restoration control unit 130 judges the execution necessity of restoration based on the information outputted by the radio section status monitoring unit 110. In other words, the restoration control unit 130 judges whether the state of the radio transmission channel section deteriorates or not more than the pre-restoration threshold value described in FIG. 6 (S902).

In the judgment of Step S902, when it is discriminated that the state of the radio section has deteriorated more than the pre-restoration threshold value (YES of S902), the restoration control unit 130 creates the stay list and the restoration list by the operation described in FIG. 8 (S903). In the restoration list, the LSP for which a communication bandwidth cannot be secured any more when a communication bandwidth of the radio transmission channel section decreased by adaptive modulation and which becomes the object of restoration is registered.

However, as a result of the restoration list creation processing of Step S903, even if a communication bandwidth of the radio transmission channel section decreased by adaptive modulation, in a case where the communication bandwidth for all LSPs currently being established can be secured, none of the LSPs is registered to the restoration list. In other words, in this case, all LSPs are registered to the stay list.

Accordingly, in the judgment of Step S904, when there is no registration LSP in the restoration list (not exist of S904), the restoration control unit 130 ends the processing without performing any more processing. On the other hand, in the judgment of Step S904, when the registered LSPs exist in the restoration list (exist of S904), the restoration control unit 130 transmits the Notify message to instruct bandwidth reservation for the alternative LSP to the initiator node of each registered LSP (S905).

The initiator node which has received the Notify message to instruct bandwidth reservation for the alternative LSP performs calculation of the alternative path to a terminator node from the present network. In that case, the initiator node performs the path calculation by excluding (exclusion) the path including the radio transmission channel section which is subject to be notified by the Notify message. As a result, it is arranged so that the section, in which the bandwidth capacity having decreased, may not be selected again. The initiator node performs bandwidth reservation for the alternative LSP based on the result of the path calculation. When the bandwidth reservation for the alternative LSP is failed, the initiator node searches for another alternative path again and performs re-establishment of a different alternative LSP.

After that, the radio section status monitoring unit 110 continues to monitor the state of the radio transmission channel section (S906). And, the restoration control unit 130 discriminates whether the state of the radio transmission channel section deteriorates more than the restoration threshold value described in FIG. 6 based on the information outputted by the radio section status monitoring unit 110 (S907).

In the judgment of Step S907, when the state of the radio transmission channel section does not deteriorate more than the restoration threshold value (NO of S907), it discriminates whether the state of the radio transmission channel section improves or not more than the restoration cancellation threshold value described in FIG. 6 (S912). And, when discriminating that it is improved more than the restoration cancellation threshold value (YES of S912), the restoration control unit 130 transmits the Notify message to instruct reservation cancellation of the alternative LSP bandwidth to the initiator node to which reservation of the alternative LSP bandwidth was instructed in Step S905 (S913). The initiator node which has received the Notify message to instruct reservation cancellation of this alternative LSP bandwidth cancels the alternative LSP for which a bandwidth has been reserved.

On the other hand, when it is discriminated that the state of the radio section does not improve more than the restoration cancellation threshold value (NO of S912), the processing returns to Step S906.

Further, in the judgment of Step S907, when it is discriminated that the state of the radio transmission channel section has deteriorated more than the restoration threshold value (YES of S907), it transmits the Notify message to instruct the restoration to the alternative LSP to the initiator node to which reservation of the alternative LSP bandwidth was instructed in Step S905 (S908). The initiator node which has received the Notify message to instruct this restoration to the alternative LSP diverts a path to the alternative LSP. And, it performs deletion of the original LSP of the restoration.

At this stage, adaptive modulation in the radio transmission channel section is not performed yet. However, diverting a path to the alternative LSP is performed at this stage for the LSP for which a bandwidth cannot be secured when a communication bandwidth decreased by adaptive modulation.

The state of the radio transmission channel section is monitored continually (S909), and it is discriminated whether the state of the radio transmission channel section deteriorates or not more than the adaptive modulation threshold value described in FIG. 6 based on the information outputted by the radio section status monitoring unit 110 (S910). This discrimination is performed by the adaptive modulation control unit 120. Further, the radio section status monitoring unit 110 may discriminate and notify the adaptive modulation control unit 120.

The judgment processing of Step S914 is processing in a case where the state of the radio transmission channel section does not deteriorate more than the adaptive modulation threshold value in the judgment of Step S910 (NO of S910).

In a case where the state of the radio transmission channel section is worse than the restoration threshold value but does not deteriorate more than the adaptive modulation threshold value, it is continually monitored whether the state of the radio transmission channel section deteriorates or not more than the adaptive modulation threshold value (NO of S914, S909, S910).

Further, in a case where the state of the radio transmission channel section is improved without reaching the adaptive modulation threshold value, and it is improved at least more than the restoration threshold value, the processing ends without adaptive modulation being performed (YES of S914). In other words, in the situation that the state of the radio transmission channel section is improved, this radio node device does not need to perform anything, because the restoration was performed in Step S908 and the restoration object LSP has already performed path diversion to the alternative LSP.

In the judgment of Step S910, when discriminating that the state of the radio section deteriorated more than the adaptive modulation threshold value (YES of S910), the adaptive modulation control unit 120 instructs the radio control device which is not illustrated to perform adaptive modulation (S911).

By the above, the radio node device 100 ends its processing.

Thus, the radio node device 100 of this exemplary embodiment prepares the restoration at time when the state of the radio transmission channel section deteriorates and it has reached the pre-restoration threshold value. In other words, the LSP which becomes the object of restoration is sorted out taking the bandwidth capacity required for the LSP currently being established and the priority order into account. Reservation of the alternative LSP is instructed to the initiator node of the object LSP of restoration. And, at time when the state of the radio transmission channel section further deteriorates and has reached the restoration threshold value, the radio node device instructs execution of restoration. However, because the radio node device has not performed adaptive modulation yet as of this, there is no change in a communication bandwidth in the radio transmission channel section. Adaptive modulation is performed at time when the state of the radio transmission channel section further deteriorates and has reached the adaptive modulation threshold value.

Figure 10:
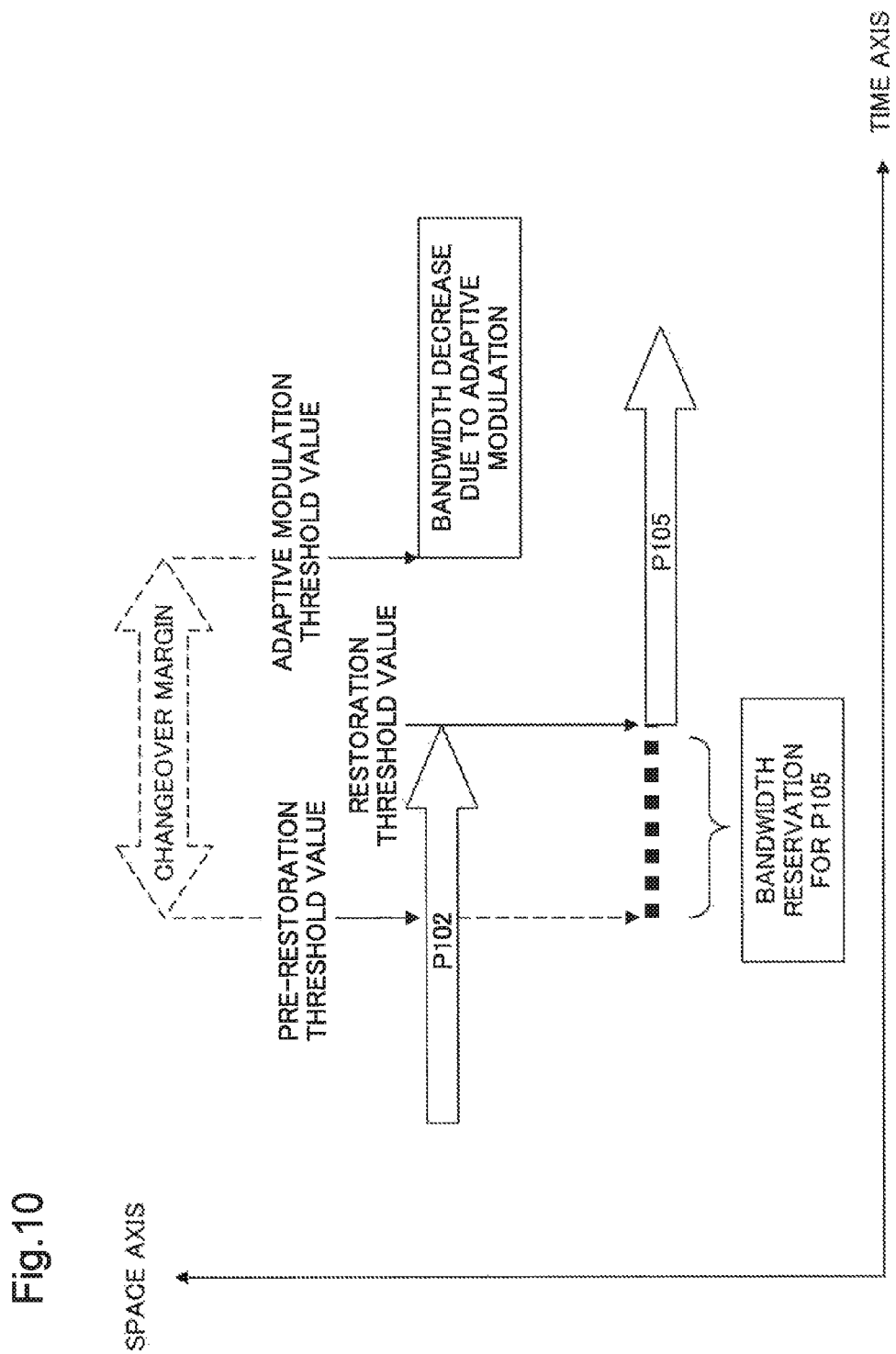
[FIG. 10] is an explanation drawing which visually indicates an effect of the exemplary embodiment of the present invention.
Figure 11:
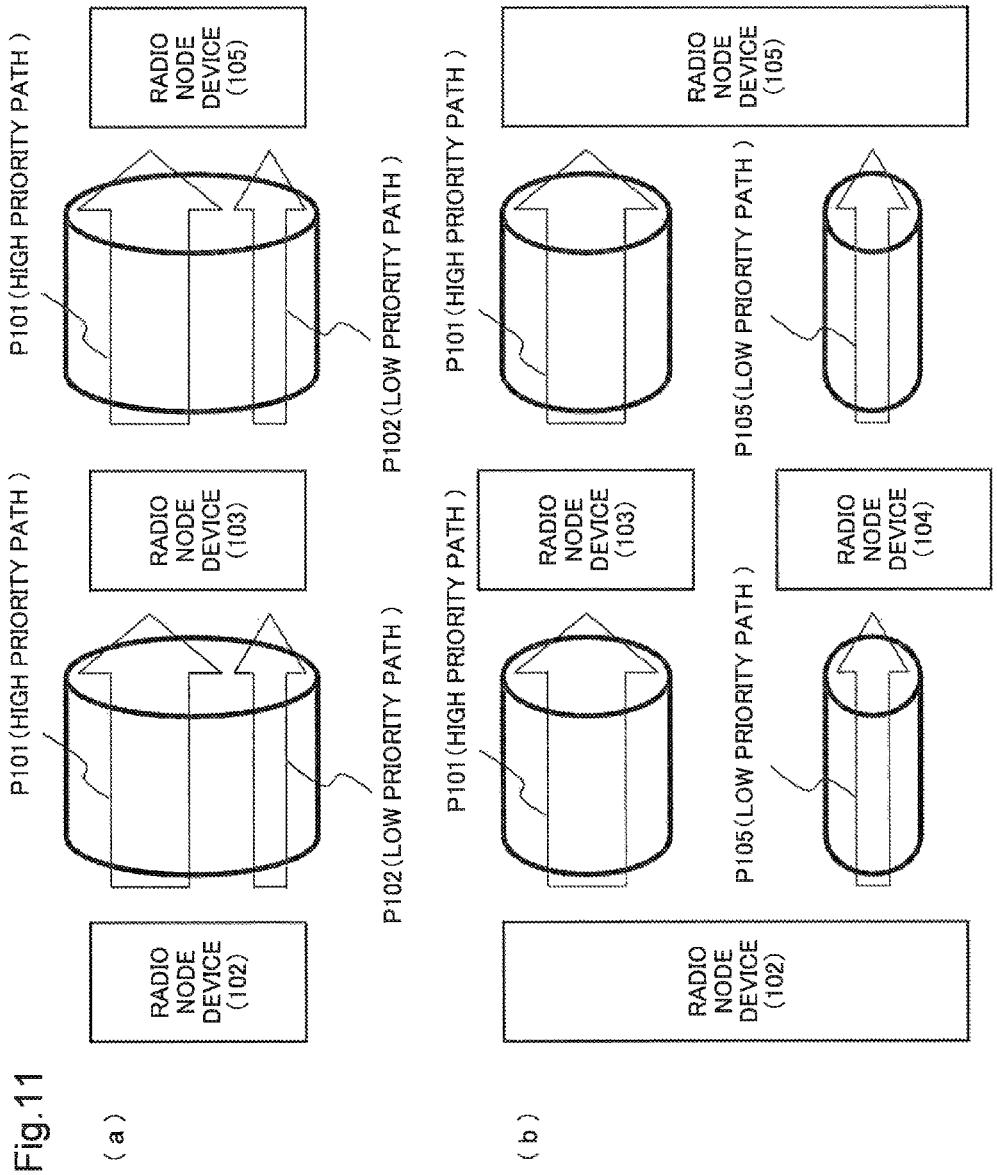
[FIG. 11] is another explanation drawing which visually indicates an effect of the exemplary embodiment of the present invention.
Figure 12:
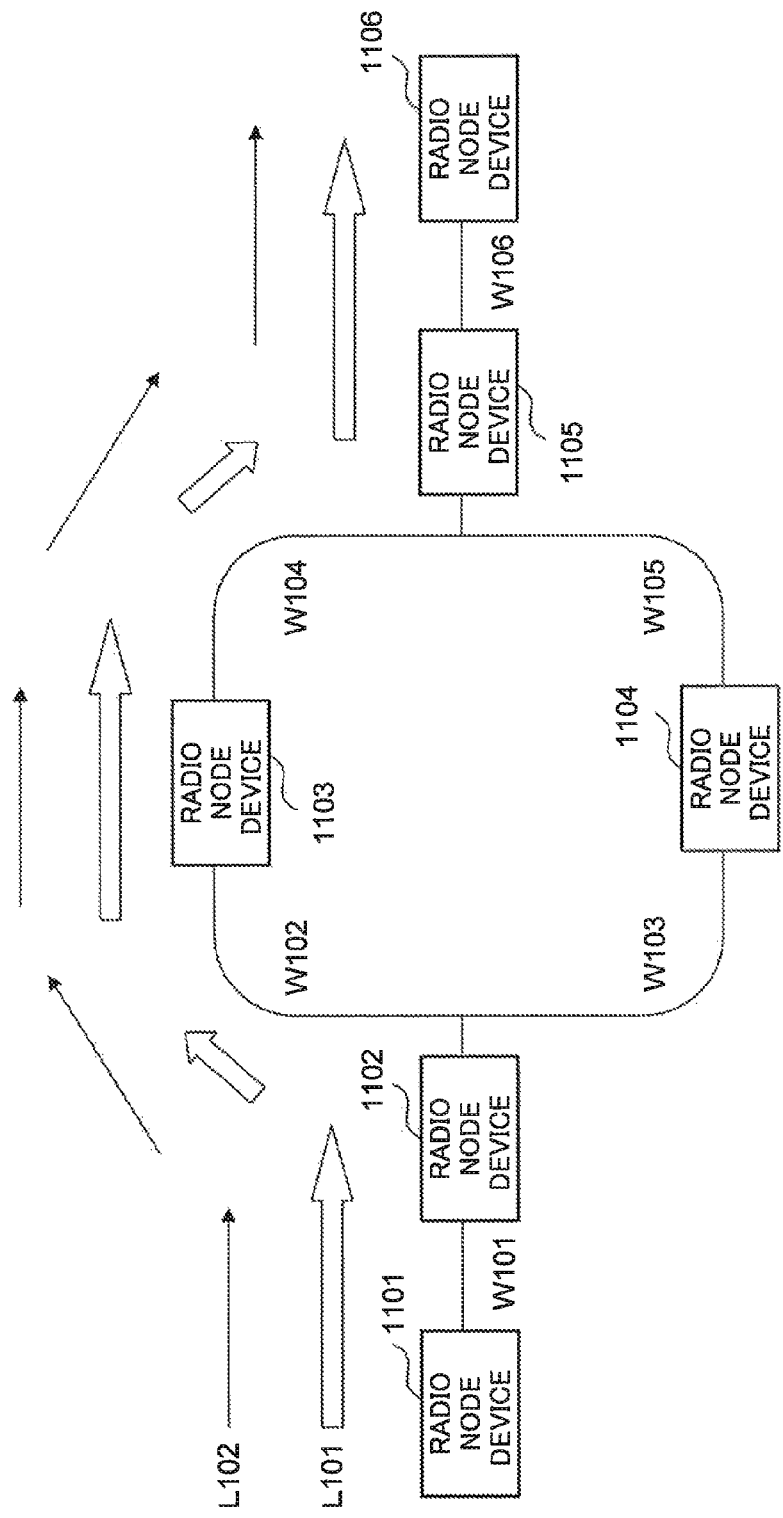
[FIG. 12] is an explanation drawing which explains a problem to be solved by the invention, and is a system configuration drawing illustrating a premise system.
Figure 13:
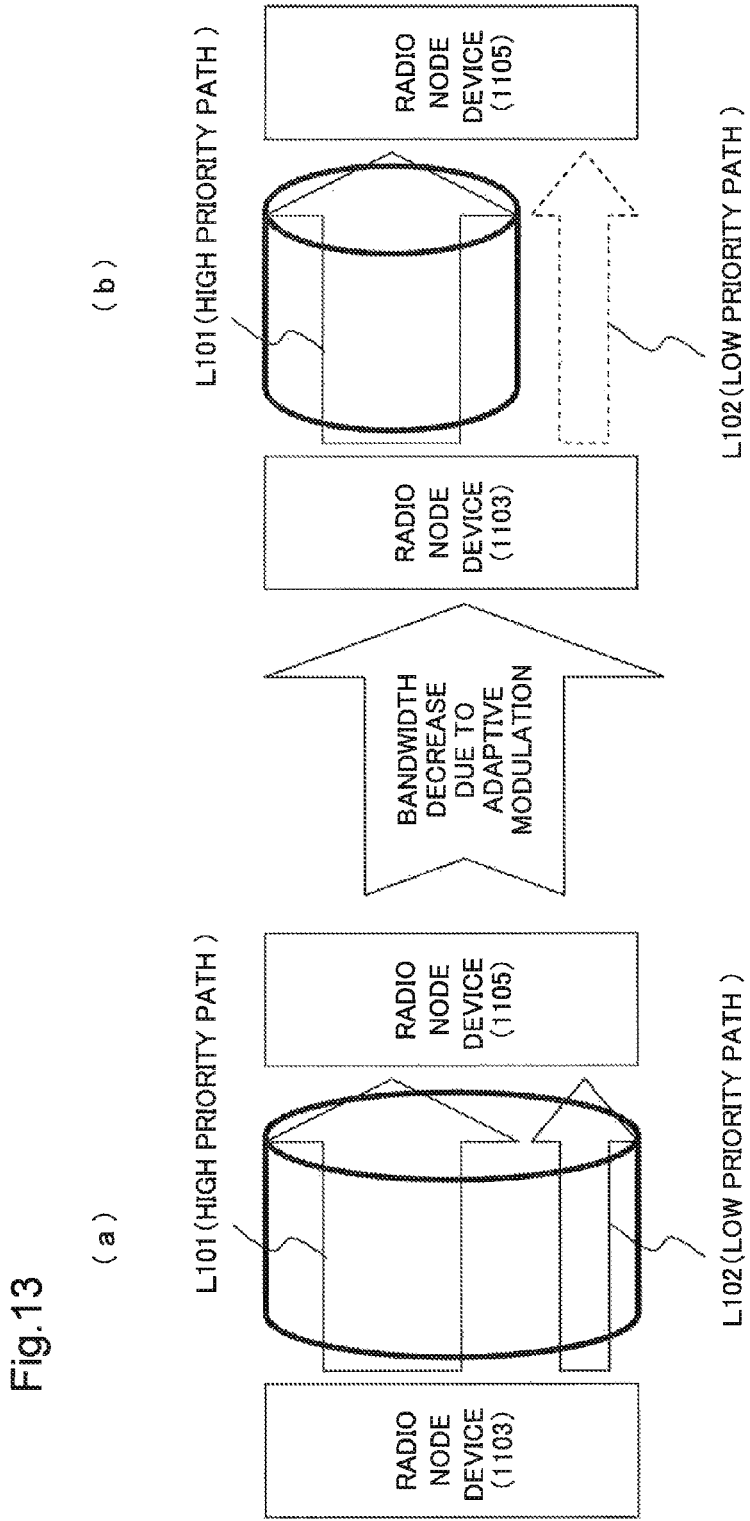
[FIG. 13] is an explanation drawing which explains a problem to be solved by the invention, and is a schematic diagram illustrating a problem when performing adaptive modulation and decreasing the transmission capacity.

FIG. 10 and FIG. 11 are explanation drawings which visually indicate an effect by this exemplary embodiment.

FIG. 10 shows each state that it reserves a bandwidth of the alternative LSP (P105) for the LSP (P102) at time when the state of the radio section has reached the pre-restoration threshold value, and it performs path diversion to the alternative LSP (P105) at time when having reached the restoration threshold value and disconnects the original LSP (P102). Accordingly, because communication using the alternative path by the alternative LSP (P105) is being performed at time when a communication bandwidth decreased by performing adaptive modulation due to the state of the radio section having reached the adaptive modulation threshold value, it can eliminate the transmission line disconnecting time and realize the bandwidth guarantee of End to End.

In FIG. 11, FIG. 11 (a) shows the state of the radio transmission channel section of the usual state, and FIG. 11 (b) shows the state of the radio transmission channel section after adaptive modulation is performed, respectively.

As has been described above, the bandwidth guaranteed system of the present invention sets the adaptive modulation changeover margin having a predetermined width to communication quality which becomes a trigger of performing the adaptive modulation which decreases a communication bandwidth when the communication quality of the radio transmission channel section has deteriorated. And, prior to performing the adaptive modulation based on the communication quality status in the adaptive modulation changeover margin, it makes path diversion to the alternative LSP perform by discriminating the LSP to which fault relief is to be applied. Therefore, the bandwidth guaranteed system of the present invention can guarantee the bandwidth to the LSP of all priority order by performing the restoration which diverts a path to the alternative LSP even in a case where a communication bandwidth decreased by adaptive modulation. Further, even when it makes the path diversion to the alternative LSP perform, it is possible to divert a path to the alternative path without having an influence on signal continuity.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-000352, filed on Jan. 5, 2010, the disclosure of which is incorporated herein in its entirety by reference.

Industrial Applicability

The present invention can be used in a communication system which is configured by connecting radio devices and MPLS (MULTI PROTOCOL LABEL SWITCHING) routers.

Description of the Codes 100 radio node device
101, 102, 103, 104, 105, 106 radio node devices
110 radio section status monitoring unit
120 adaptive modulation control unit
130 restoration control unit
131 threshold judging control unit
132 restoration list creation unit
133 Notify transmission control unit

The invention claimed is:

1. A bandwidth guaranteeing method in an MPLS (MULTI PROTOCOL LABEL SWITCHING) network adopting adaptive modulation, comprising the steps of:

setting an adaptive modulation changeover margin that is based on communication quality of a radio transmission channel section;

prior to performing the adaptive modulation, in the adaptive modulation changeover margin, according to a deterioration condition of the communication quality, reserving a bandwidth of an alternative LSP (Label Switched Path) for establishing an alternative path by restoration for an LSP being established in the radio transmission channel section and continuing communication by performing changeover to the alternative path using the alternative LSP;

discriminating an LSP which requires the restoration among the LSPs established in the radio transmission channel section and instructing the initiator node to reserve a bandwidth of the alternative path, when the communication quality has reached a predetermined first threshold value in the adaptive modulation changeover margin; and instructing the initiator node to perform changeover to the alternative LSP for which a bandwidth has been reserved, when the communication quality has reached a second threshold value which indicates further deteriorated state more than the first threshold value.

2. The bandwidth guaranteeing method according to claim 1, further comprising:

instructing the initiator node to cancel bandwidth reservation for the alternative LSP which was instructed at the time of reaching the first threshold value in a case where after the communication quality has reached the predetermined first threshold value, and has reached a predetermined improved threshold value which indicates improved state more than the first threshold value without reaching the second threshold value.

3. The bandwidth guaranteeing method according to claim 1, further comprising:

discriminating the LSP, for which a communication bandwidth cannot be secured any more in a case where a communication bandwidth of the radio transmission channel section decreased by the adaptive modulation, based on the communication bandwidth required for respective LSPs established in the radio transmission channel section and the priority set to the respective LSPs, when the communication quality having reached the first threshold value.

4. A bandwidth guaranteed system configured to:

configure, by a first radio node, an MPLS (MULTI PROTOCOL LABEL SWITCHING) network and set an adaptive modulation changeover margin that is based on communication quality and used as a trigger to performing adaptive modulation which decreases a communication bandwidth when the communication quality of a radio transmission channel section has deteriorated, and prior to performing the adaptive modulation, in the adaptive modulation changeover margin, instructs an initiator node which has established an LSP (Label Switched Path) in the radio transmission channel section to reserve a bandwidth of an alternative LSP for the LSP which requires restoration of diverting to an alternative path and to change over to the alternative LSP; and configure, by a second radio node, the MPLS network, that is the initiator node and according to the instructions from the first radio node, reserves a bandwidth of the alternative LSP, performs changeover to the alternative LSP and disconnects the LSP which has been changed over to the alternative LSP, wherein the adaptive modulation changeover margin comprises, a first threshold value which is used for discriminating the LSP which requires the restoration among the LSPs being established in the radio transmission channel section, and becomes a trigger of instructing the second radio node to reserve a bandwidth of the alternative LSP, a second threshold value which indicates more deteriorated state of the communication quality than the first threshold value, and instructs the second radio node to perform changeover to the alternative LSP for which a bandwidth has been reserved, and a third threshold value which indicates more deteriorated state of the communication quality than the second threshold value, and becomes a trigger of performing the adaptive modulation and decreasing a communication bandwidth of the radio transmission channel section.

5. The bandwidth guaranteed system according to claim 4, wherein the adaptive modulation changeover margin further comprises a fourth threshold value which indicates improved state of the communication quality more than the first threshold value, and wherein the first radio node, when having detected the fourth threshold value without detecting the second threshold value after detected the first threshold value, instructs the second radio node to cancel bandwidth reservation for the alternative LSP which was instructed at the time of detecting the first threshold value.

6. The bandwidth guaranteed system according to claim 4, wherein the first radio node, when having detected the first threshold value, discriminates the LSP, for which a communication bandwidth cannot be secured any more in a case where a communication bandwidth of the radio transmission channel section decreased by the adaptive modulation, based on the communication bandwidth required for respective LSPs being established in the radio transmission channel section and the priority set to the respective LSPs.

* * * * *